(12) United States Patent
Liu

(10) Patent No.: US 10,036,548 B2
(45) Date of Patent: Jul. 31, 2018

(54) ELECTRONIC-CIGARETTE BOX, LED LIGHT GUIDE PIECE AND BOX BODY

(71) Applicant: KIMREE HI-TECH INC., Tortola (VG)

(72) Inventor: Qiuming Liu, Huizhou (CN)

(73) Assignee: HUIZHOU KIMREE TECHNOLOGY CO., LTD., SHENZHEN BRANCH, Shenzhen, Guangdong Province (CN)

( * ) Notice: Subject to any disclaimer, the term of this patent is extended or adjusted under 35 U.S.C. 154(b) by 683 days.

(21) Appl. No.: 14/412,436

(22) PCT Filed: Apr. 7, 2013

(86) PCT No.: PCT/CN2013/073815
§ 371 (c)(1),
(2) Date: Dec. 31, 2014

(87) PCT Pub. No.: WO2014/166031
PCT Pub. Date: Oct. 16, 2014

(65) Prior Publication Data
US 2016/0091194 A1     Mar. 31, 2016

(51) Int. Cl.
*F21V 33/00* (2006.01)
*A24F 15/18* (2006.01)
(Continued)

(52) U.S. Cl.
CPC .......... *F21V 33/0004* (2013.01); *A24F 15/18* (2013.01); *A24F 47/002* (2013.01);
(Continued)

(58) Field of Classification Search
None
See application file for complete search history.

(56) References Cited

U.S. PATENT DOCUMENTS

2005/0093510 A1* 5/2005 Seil ..................... H01M 2/1055
320/114
2012/0281392 A1* 11/2012 Workman ................. H02J 7/35
362/183

FOREIGN PATENT DOCUMENTS

CN       1512620 A     7/2004
CN     101000476 A     7/2007
(Continued)

OTHER PUBLICATIONS

Machine translation of CN201591127, no date.*

*Primary Examiner* — Michael J Felton
*Assistant Examiner* — Katherine Will
(74) *Attorney, Agent, or Firm* — Cheng-Ju Chiang

(57) ABSTRACT

An electronic-cigarette box including a box body, wherein, a first printed circuit board is accommodated in the box body, an LED lamp for displaying electric quantity and a push-button switch for controlling the LED lamp are disposed on the first printed circuit board, two or more through holes are disposed in the side wall of the box body, and the cigarette box also includes an LED light guide piece which comprises a substrate, with one side of the substrate extending outward and forming light guide cylinder and push-button corresponding to the through holes, wherein the light guide cylinder corresponds to the LED lamp, the push-button corresponds to the push-button switch. The LED light guide piece has a simple structure and is easy to be installed.

13 Claims, 4 Drawing Sheets

(51) Int. Cl.
*H01M 10/42* (2006.01)
*H01M 10/48* (2006.01)
*B65D 25/10* (2006.01)
*B65D 43/14* (2006.01)
*F21V 17/16* (2006.01)
*F21V 23/04* (2006.01)
*A24F 47/00* (2006.01)
*F21W 111/10* (2006.01)

(52) U.S. Cl.
CPC ............. *B65D 25/10* (2013.01); *B65D 43/14* (2013.01); *F21V 17/16* (2013.01); *F21V 23/0414* (2013.01); *H01M 10/425* (2013.01); *H01M 10/488* (2013.01); *A24F 47/008* (2013.01); *F21W 2111/10* (2013.01)

(56) References Cited

FOREIGN PATENT DOCUMENTS

| | | |
|---|---|---|
| CN | 201499600 U | 6/2010 |
| CN | 201550602 U | 8/2010 |
| CN | 201571500 U | 9/2010 |
| CN | 201591127 U | 9/2010 |
| CN | 102132957 A | 7/2011 |
| CN | 202122096 U | 1/2012 |
| CN | 102687070 A | 9/2012 |
| JP | 2002-319324 A | 10/2002 |
| JP | 2005-195352 A | 7/2005 |
| JP | 2005-337281 A | 12/2005 |

\* cited by examiner

ELECTRONIC-CIGARETTE BOX, LED LIGHT GUIDE PIECE AND BOX BODY

CROSS REFERENCE TO RELATED APPLICATIONS

The present application is a 35 U.S.C. § 371 National Phase conversion of International (PCT) Patent Application No. PCT/CN2013/073815, filed on Apr. 7, 2013, the disclosure of which is incorporated by reference herein. The PCT International Patent Application was filed and published in Chinese.

FIELD OF THE INVENTION

The present invention relates to the field of electronic-cigarettes, especially an electronic-cigarette box, an LED light guide piece and a box body.

BACKGROUND OF THE INVENTION

Existing electronic-cigarette box generally comprises a box body and a bracket accommodated inside the box. In order to facilitate to recharge the electronic-cigarette placed in the bracket, a rechargeable battery may also be disposed in the bracket.

However, there is no component set on the cigarette box used for displaying electric quantity of the rechargeable battery, so that the user is not able to know the situation of the remaining electric quantity of the rechargeable battery when being outside with the cigarette box, and this will cause great inconvenience to the smoker when the electronic-cigarette has no power or the rechargeable battery is low and the smoker has no charger with him.

SUMMARY OF THE INVENTION

The object of the present invention is to provide an electronic-cigarette box, wherein an LED light guide piece has a simple structure and is easy to be installed.

To achieve the above mentioned object, the present invention provides an electronic-cigarette box including a box body. Wherein, a first printed circuit board is accommodated in the box body, a LED lamp for displaying electric quantity and a push-button switch for controlling the LED lamp are disposed on the first printed circuit board, two or more through holes are disposed in the side wall of the box body, and the cigarette box also includes an LED light guide piece which comprises a substrate, one side of the substrate extending outward and forming light guide cylinder and push-button corresponding to the through holes, wherein the light guide cylinder corresponds to the LED lamp, the push-button corresponds to the push-button switch.

Furthermore, the bottom wall of the box body is provided with a positioning bone. One end of the LED light guide piece is snap-fitted in the space formed between the positioning bone and the side wall of the box body.

Furthermore, the inside of the box body is provided with a baffle extending along the side wall, the baffle and the side wall forming an import slot. One side of the import slot which is at the bottom wall of the box body has an opening, and via the opening the LED light guide piece is inserted and fitted within the box body along the import slot.

Furthermore, the positioning bone is disposed on the bottom wall of the box body by integrally molding.

Furthermore, the cigarette box includes a main bracket which is accommodated within the box body. The LED light guide piece is disposed between the box body and the main bracket. The inside of the main bracket is provided with a rechargeable battery, which is electrically connecting to the first printed circuit board and shows the remaining electric quantity thereof via the lightening status of the LED lamp.

Furthermore, the first printed circuit board is provided with four monochrome LED lamps of same color, which in order are first LED lamp, second LED lamp, third LED lamp and fourth LED lamp from top to bottom. The first LED lamp, the second LED lamp, the third LED lamp and the fourth LED lamp are arranged at intervals on the first printed circuit board with uniform length and direction.

Furthermore, under the control of the push-button switch, the first, second, third and fourth LED lamps are all lightened when the electric quantity of the rechargeable battery is from 76% to 100%; the first, second and third LED lamps are all lightened when the electric quantity of the rechargeable battery is from 51% to 75%; the first and second LED lamps are both lightened when the electric quantity of the rechargeable battery is from 26% to 50%; and the first LED lamp is lightened when the electric quantity of the rechargeable battery is 25%.

Furthermore, under the control of the push-button switch, the fourth LED lamp is lightened when the electric quantity of the rechargeable battery is from 76% to 100%; the third LED lamp is lightened when the electric quantity of the rechargeable battery is from 51% to 75%; the second LED lamp is lightened when the electric quantity of the rechargeable battery is from 26% to 50%; and the first LED is lightened when the electric quantity of the rechargeable battery is 25%.

Furthermore, the first printed circuit board is only provided with one LED lamp thereon, the inside of the LED lamp has at least two LED chips of different color. Under the control of the push-button switch, the LED chip with different color corresponding to different electric quantity of the rechargeable battery is lightened.

Furthermore, the cigarette box includes a cover body which is movably connected to the box body, and the open or close of the cover body is achieved under external force.

Furthermore, the cigarette box includes a semi-automatic clamshell mechanism comprising a cam, a sliding block and a damping element; the vice bracket includes an accommodation cavity, in which both of the sliding block and the damping element are disposed; the fixed end of the cam is rotatably fixed to the main bracket, and the free end of the cam is held in the cover body, the sliding block is connected between the cam and the damping element; the vice bracket is located at one side of the main bracket and near to the inside wall of the cigarette box.

Furthermore, the second printed circuit board is fixed to the main bracket by means of screw or snapping, and the second printed circuit board is provided with a charging port, via the charging port an external power source provides power for the rechargeable battery.

Furthermore, the second printed circuit board is provided with an output port, and the rechargeable battery provides power for external device via the output port.

Furthermore, the charging port and the output port are both USB interfaces.

Furthermore, the main bracket is provided with at least one battery rod accommodation cavity. When the battery rod of an external electronic-cigarette is inserted in the battery rod accommodation cavity, the battery rod is recharged by the rechargeable battery.

The electronic-cigarette box of the present invention: by integrally disposing at least one LED lamp and push-button switch controlling the same on the same side of the first printed circuit board, an integrated LED light guide piece is formed, which has a simple structure with no need of separately installing the first printed circuit board, the LED lamp and the push-button switch step by step. This can achieve convenient installation, save time cost, and improve production efficiency. Moreover, the integrated design of LED light guide piece is not easy to appear the problem of installation alignment error, and thus improves the reliability of products.

The object of the present invention is also to provide an LED light guide piece fitting in the electronic-cigarette box, which LED light guide piece has simple structure and can be easily installed within the electronic-cigarette box.

To achieve the above mentioned object, the present invention also provides an LED light guide piece fitting in the electronic-cigarette box. Wherein, the LED light guide piece includes a substrate, one side of the substrate extends outward and forms light guide cylinder and push-button corresponding to the through holes provided in the side wall of the outside box body, wherein the light guide cylinder corresponds to the LED lamp on the first printed circuit board which is provided within the outside box body, and the push-button corresponds to the push-button switch on the first printed circuit board which is provided within the outside box body.

The LED light guide piece fitted in the electronic-cigarette box of the present invention: by disposing LED light guide cylinder and push-button on the same side of the substrate, an integrated LED light guide piece is formed, which has a simple structure with no need of separate and stepwise installation. This can achieve convenient installation, save time cost, and improve production efficiency. Moreover, the integrated design of LED light guide piece is not easy to appear the problem of alignment error during installation with the box body, and thus improves the reliability of products.

The object of the present invention is also to provide an box body for electronic-cigarette box, wherein the box body has a simple structure and is easy to be installed with an outer LED light guide piece.

To achieve the above object, the present invention also provides a box body for electronic-cigarette box, wherein, the box body accommodates a first printed circuit board therein, and the first printed circuit board is provided with a LED lamp for displaying electric quantity and a push-button switch for controlling the LED lamp; the side wall of the box body is provided with two or more through holes for separately corresponding to the light guide cylinder and push-button which are disposed on the outer LED light guide piece.

Furthermore, the bottom wall of the box body is provided with a positioning bone. One end of the outer LED light guide piece is snap-fitted in the space formed between the positioning bone and the side wall of the box body.

Furthermore, the inside of the box body is provided with a baffle extending along the side wall, the baffle and the side wall form an import slot. One side of the import slot at the bottom wall of the box body has an opening, and via the opening the outer LED light guide piece is inserted and fitted inside the box body along the import slot.

The box body for electronic-cigarette box of the present invention: the box body has a simple structure and is provided with through holes corresponding to the light guide cylinder and push-button of the outer LED light guide piece one-to-one, and the installation of the box body is convenient and fast.

Embodiments of the present invention are further described in detail below, with reference to the accompanying drawings.

DETAILED DESCRIPTION OF THE INVENTION

Figure 1:
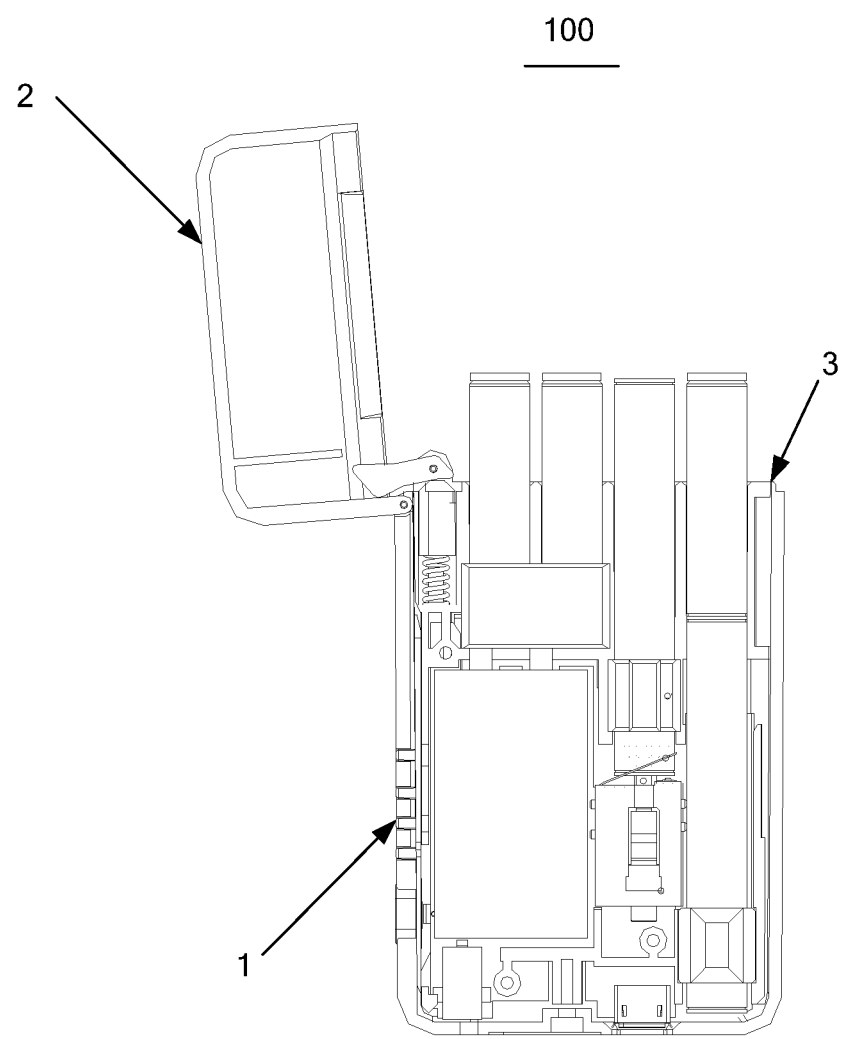
FIG. 1 is a perspective view of the electronic-cigarette box in accordance with the embodiment of the invention.

As shown in FIG. 1, an electronic-cigarette box 100 of the embodiment of the present invention includes a box body 1 and a cover body 2, the cover body 2 is movably connected to the box body 1 through a first shaft 23.

Figure 2:
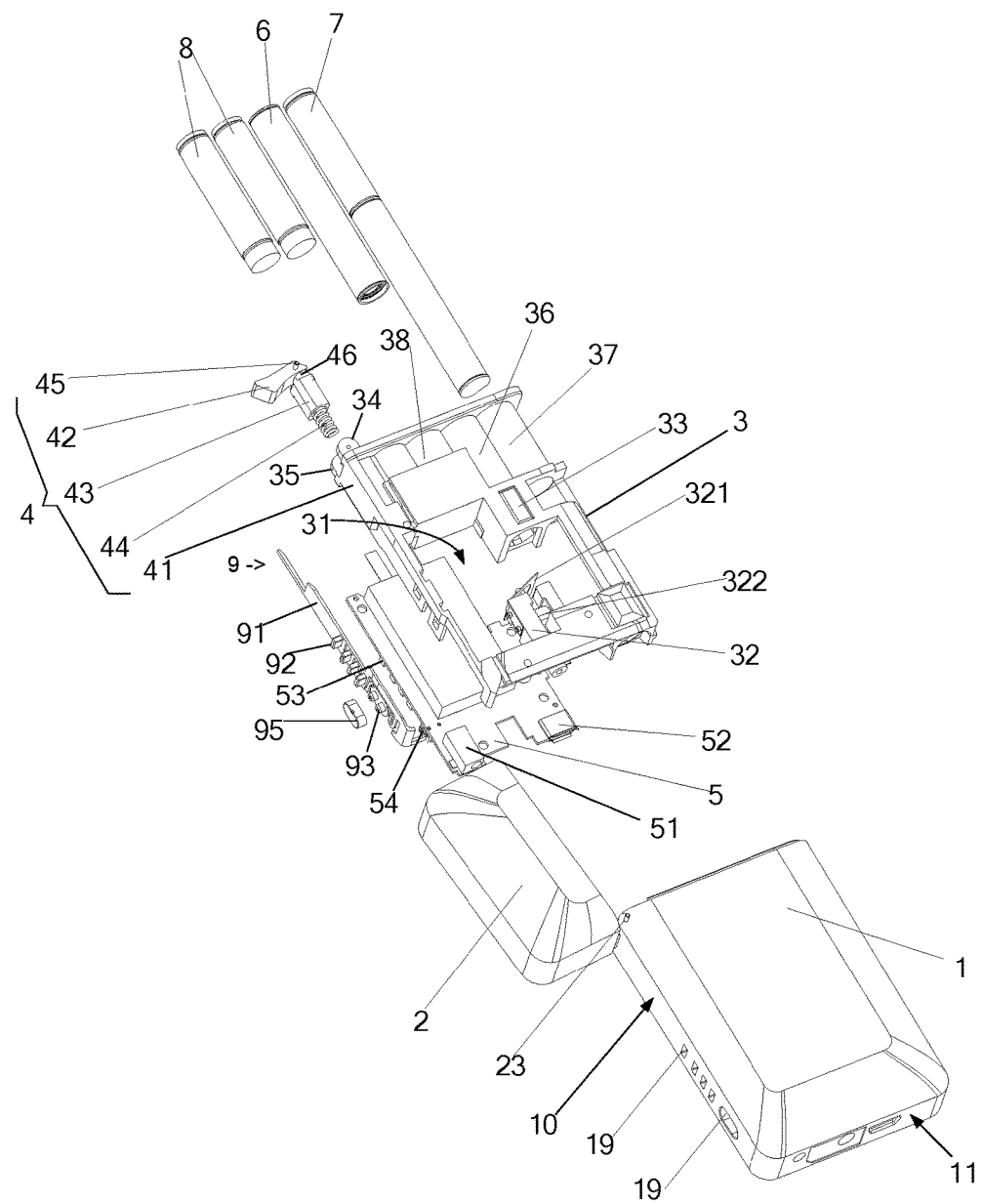
FIG. 2 is an exploded view of the cigarette box shown in FIG. 1.

Specifically, with referring to FIG. 2, the box body 1 has a bracket installed therein, the bracket includes a main bracket 3 and a vice bracket 41 for storing electronic-cigarette component and battery, charging structure etc.; also includes a semi-automatic clamshell mechanism 4 of the cigarette box. It is understood that, the main bracket 3 and the side bracket 41 can be configured as an integrated structure, or can also be formed independently and then assembled together.

Furthermore, with continued reference to FIG. 2, the cigarette box 100 also includes semi-automatic clamshell mechanism 4, the semi-automatic mechanism 4 includes a cam 42, a sliding block 43, and a damping element 44. The vice bracket 41 is provided with an accommodation cavity 40 therein, both of the sliding block 43 and the damping element 44 are disposed in the accommodation cavity 40. The damping element 44 is abutted to the bottom end of the sliding block 43 at one end thereof, and the other end is abutting to the bottom wall 412 of the accommodation cavity 40 provided in the vice bracket 41. The fixed end of the cam 42 is provided with a shaft hole (not shown in the figure). The vice bracket 41 is located at one side of the main bracket 3 and installed on top of the side wall of the cigarette box 100. The main bracket 3 is provided with a first ear piece 34 and a second ear piece 35 oppositely at the end which is located at the top opening of the box body 1. By running successively through the first ear piece 34, the shaft hole of the cam and the second ear piece 35 with a second shaft 45, the fixed end of the cam 42 is rotatably fixed to the main bracket 3. Moreover, the sliding block 43 is provided with a first convex block 46 at the surface thereof adjacent to the fixed end of the cam 42, the fixed end of the cam 42 remains point contact with the first convex block 46 at any time. The cover body 2 also has a baffle 24 fixed inside, the baffle 24 and the side wall 25 of the cover body 2 are parallel and have a certain distance therebetween. The free end of the cam 42 extends between the baffle 24 and the side wall 25, and is defined by the baffle 24 and the side wall the 25 respectively. External force acts on the cover body 2 and drives the cam 42 rotating through the baffle 24 or the side wall 25, and thus drives the sliding block 43 and the damping element 44 performing linear reciprocating motion in the accommodation cavity of 40.

Figure 4:
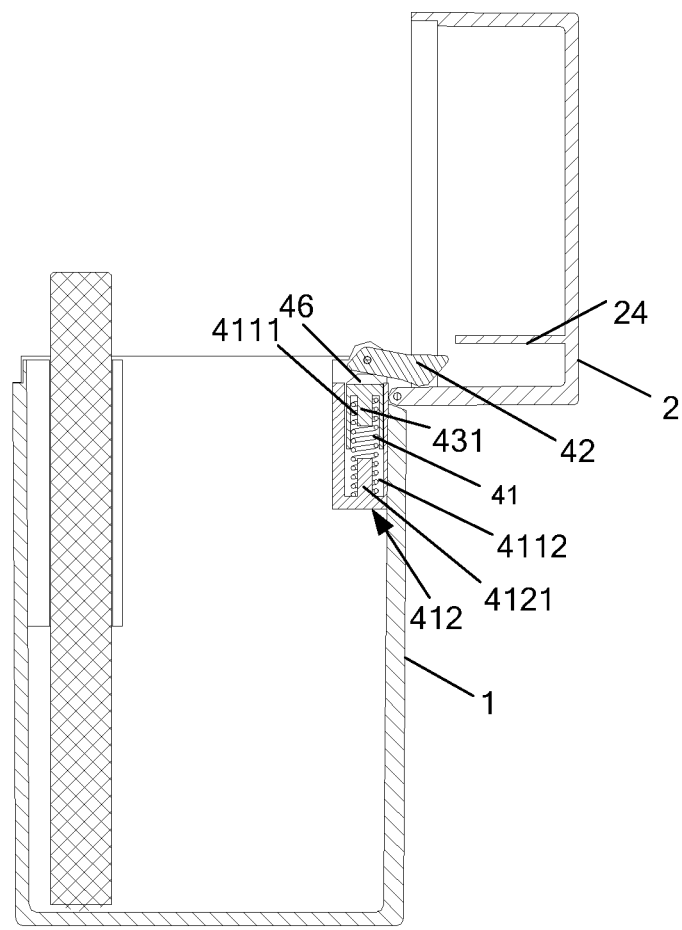
FIG. 4 is an enlarged schematic view of the cigarette box shown in FIG. 1 under the state of the cover being opened.

In a specific embodiment, combining FIGS. 2 and 4, the damping element 44 is a compression spring. Specifically, the sliding block 43 can be provided with a first guide rail 4111 and a second guide rail 4112 in parallel to each other, the first guide rail 4111 and the second guide 4112 run through the compression spring. And, the bottom of the sliding block 43 away from the first end of the cam 42 is provided with a second convex block 431, the bottom wall 412 of the vice bracket 41 is provided with a third convex block 4121, wherein the second convex block 431 and the third convex block 4121 is abutted to both ends of the compression spring respectively from between the first guide rail 4111 and the second guide rail 4112, the second convex block 431 is used to guide one end of the compression spring from the third convex block 312 of the bottom wall 412 vertically upward corresponds to the second convex block 431 in order to set the other end of the compression spring. Wherein, by setting the first guide rail 4111 4112 and second guide rail running through the compression spring, as well as the second convex block 431 and the third convex block 4121 abutting to both ends of the compression spring respectively from between the first guide rail 4111 and the second guide rail 4112, it is capable of ensuring the elastic deformation of the compression spring on predetermined route, which results in better reliability and more convenient installation. Of course, in other embodiments, the damping element 44 may be also made from rubber with high elasticity or other materials.

Combining FIGS. 1 and 4, the main working principle of opening or closing the cover body 2 is:

A) as opening the cover body 2 by hand, the cover body 2 drives the cam 42 to rotate and compress the spring downward, and the cam 42 will automatically rotate and drive the cover body 2 to open automatically under the upward force of the compression spring and the sliding block 43 after reaching a certain angle, meanwhile the cam 42 may hit against the cover body 2 and generate a sound of "Ka Ka"; b) as closing the cover body 2, the cover body 2 drives the cam 42 to rotate and compress the spring downward, and the cam 42 will automatically rotate and drive the cover body 2 to close automatically under the upward resilience force of the compression spring and the sliding block 43 after reaching a certain angle, meanwhile the cam 42 may hit against the cover body 2 and generate a sound of "Ka Ka".

By configuring the semi-automatic clamshell mechanism 4, it is capable of opening or closing of the cover body 2 by external force, which can realize the semi-automatic clamshell performance and thus improve operational interest.

Figure 3:
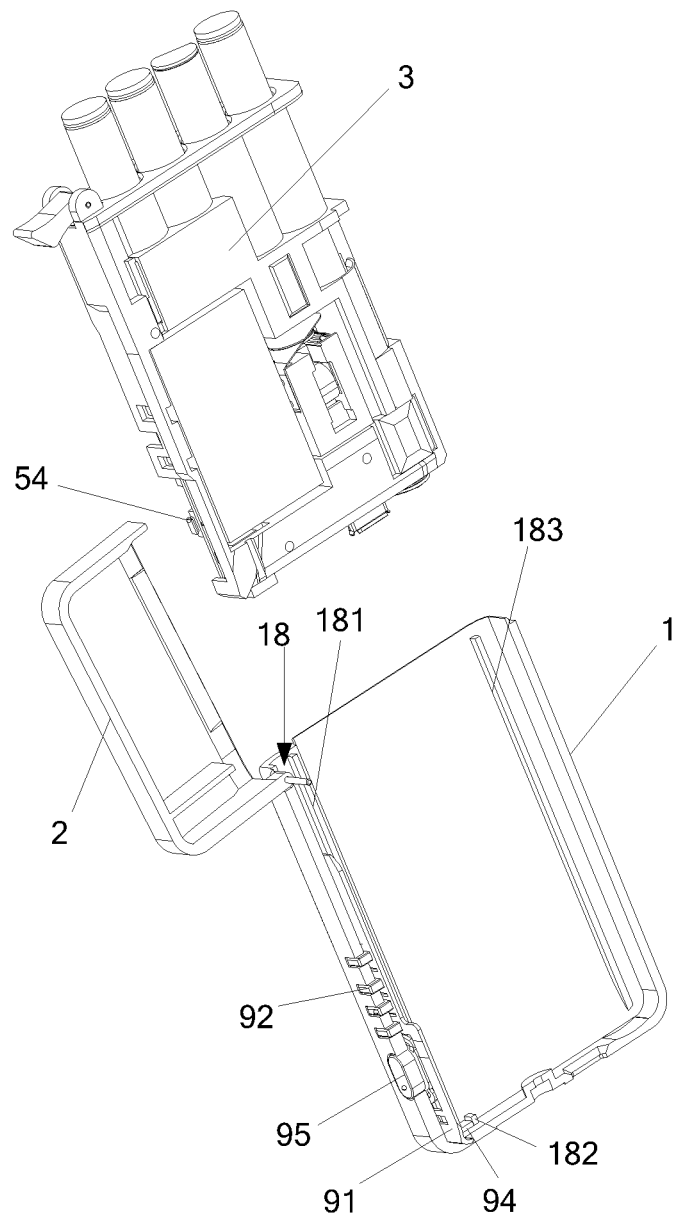
FIG. 3 is a flowchart for the installation of the cigarette box shown in FIG. 1.

With continued reference to FIGS. 2~3, in a specific embodiment, a first printed circuit board 5 is accommodated in the box body 1, an LED lamp 53 and a push-button switch 54 for controlling the LED lamp 53 are disposed on the first printed circuit board 5, two or more through holes 19 are disposed in the side wall 10 of the box body 1, and the cigarette box 100 also includes an LED light guide piece 9 which comprises a substrate 91, with one side of the substrate 91 extending outward and forming light guide cylinder 92 and push-button 93 corresponding to the through holes 19, wherein the light guide cylinder 92 corresponds to the LED lamp 53, the push-button 93 corresponds to the push-button switch 54.

Furthermore, the bottom wall 11 of the box body 1 is provided with a positioning bone 182, one end (as the end marked as 94 shown in FIG. 3) of the LED guide light piece 9 is snap-fitted in the space formed between the positioning bone 182 and the side wall 10 of the box body 1. Wherein, the positioning bone 182 can be provided on the box body 1 by integrally molding. Of course, the positioning bone 182 also can be provided by other ways. The positioning bone 182 is used for quick positioning when installing the light guide piece 9 in the box body 1, which can facilitate installation, reducing the probability of error, and improving productivity as well as product reliability.

Furthermore, as shown in FIG. 2, the inside of the box body 1 is provided with a baffle 181 extending along the lengthwise direction of the side wall 10, wherein the baffle 181 has a shape of strip and forms an import slot 18 together with the side wall 10. In addition, the bottom portion 11 of the box body 1 is provided with an opening (not shown) for inserting the LED light guide piece 9, the opening communicating with the import slot 18. When assembling the LED light guide piece 9 in the box body 1 along the import slot 18 since the opening, it is possible of first aligning the light guide cylinders 92 on the LED light guide piece 9 with the LED lamps 53 of the first printed circuit board 5 in one-to-one correspondence, and aligning the push-button 93 on the LED light guide piece 9 with the push-button switch 54 of the first printed circuit board 5, then aligning the light guide cylinders 92 and push-button 93 with the through holes 19 in the box body 1 respectively. After the LED light guide piece 9 is assembled in the box body 1 through the import slot 18, a push-button cover 95 is assembled to the push-button 93 to protect the push-button 93, so that the whole installation of the LED light guide piece 9 is accomplished. In this embodiment, disposition of import slot 18 can facilitate the positioning and installation of the light guide piece 9. In addition, disposing another strip-shaped baffle 183 which is parallel to the strip-shaped baffle 181 with a certain distance between the two strip-shaped baffles 181 and 183, can facilitate installing the main bracket 3 in the box body 1 as mentioned in other parts of this full text.

In the above embodiment, disposing the light guide cylinders 92 and the push-button 93 on the substrate 91 to form an integrated LED light guide piece 9, the LED light guide piece 9 has a simple structure with no need of installing the light guide 92 and the push-button 93 separately and step by step. The installation can be achieved by merely inserting the LED light guide piece 9 in whole and corresponding the correspondent components on the LED light guide piece 9 to the through holes 19 in the side wall 10 of box body 1 one-to-one, which can facilitate the installation and improve production efficiency. Moreover, the integrated design of LED light guide piece 9 is not easy to appear the problem of installation alignment error, and thus improves the reliability of products.

Continuing to refer to FIG. 2, in a specific embodiment, the box body 1 accommodates the main bracket 3 therein, and the main bracket 3 is fixed in the box body 1 by screws. The LED light guide piece 9 is disposed between the box body 1 and the main bracket 3. Additionally, the main bracket 3 also includes at least a battery cavity 31, an electrode bracket 32 and at least one battery rod accommodation cavity 36. The inside of the battery cavity 31 is loaded with a rechargeable battery 311, the rechargeable battery 311 electrically connecting to the substrate 91. In addition, the electrode bracket 32 has a first positive pole 321 and first negative pole 322 disposed thereon, the first positive pole 321 and the first negative pole 322 electrically connecting at one end thereof to the corresponding battery positive electrode (not shown) and battery negative electrode (not shown) of the rechargeable battery 311, respectively. When the external battery rod 6 is inserted into the battery rod accommodation cavity 36, the second positive electrode (not shown) and the second negative electrode (not shown) of the battery (not shown) in the battery rod 6 separately abuts to first negative pole 322, and the second positive electrode forms a closed electric circuit with the rechargeable battery 311 so that the battery is charged by the rechargeable battery 311; when the external battery rod 6 is pulled out from the battery rod accommodation cavity 36, the electric circuit is opened and charging to the battery rod 6 is stopped. By utilizing the reusable characteristic of the rechargeable battery 311 it is capable of improving the service life of the cigarette box 100 and thus saving the cost of the cigarette box 100.

Specifically, continuing to refer to FIG. 2, one end of the battery rod accommodation cavity 36 adjacent to the electrode bracket 32 is further provided with a locking component 33. The locking component 33 is of hollow structure, and the hollow structure can just allow for inserting of the external battery rod 6. After being inserted in the battery rod accommodation cavity 36 and the hollow structure of the locking component 33 successively, the external battery rod 6 is eventually fastened by the locking component 33. Wherein, the locking component 33 may be made from silicone material, so as to realize the fastening of the external battery rod 6 by exploiting the relative large friction coefficient of silicone material. In the present invention embodiment, there is no need to additionally design a control button for controlling the charging performance to the external battery rod 6, but merely insert or pull the battery rod. That is, insert the external battery rod 6 into the battery cavity, and abut the second positive electrode and the second negative electrode to the first negative pole 322 and the first positive pole 321 separately, so that the electric circuit is closed to conduct charging; while pulling the external battery rod 6 out of the battery cavity 31, that is disconnecting the second positive electrode and the second negative electrode with the first negative pole 322 and the first positive pole 321, the closed electric circuit can be opened to stop charging. The operation is simple and quick, without additional button design, and is able to reduce the cost of hardware.

Furthermore, the rechargeable battery 311 shows the remaining electric quantity thereof through the lightening status of the LED lamps 53. Of course, on the first printed circuit board 5 there should also be disposed a detection circuit (not shown) for detecting the remaining electric quantity of the rechargeable battery 311. Generally, by collecting repeatedly the voltage values of the rechargeable battery 311 at different times and getting the average value thereof, the detection circuit calculates the correspondent remaining electric quantity and then provides the same to the LED lamp 53 to perform the corresponding display, which would not be repeated much herein.

In a specific application implementation, continuing to refer to FIG. 2, the first printed circuit board 5 is provided with four monochrome LED lamps 53 of same color, which in order are first LED lamp (not shown), second LED lamp (not shown), third LED lamp (not shown) and fourth LED lamp (not shown) from top to bottom based on the direction shown in FIG. 2. The first LED lamp, the second LED lamp, the third LED lamp and the fourth LED lamp are arranged at intervals on the first printed circuit board 5 with uniform length and direction. That is, correspondingly, the light guide cylinders 92 on the LED light guide piece 9 are arranged at intervals on the substrate 91 with uniform length and direction, so as to accommodate the first, second, third and fourth LED lamps one-to-one correspondingly.

When performing the display of electric quantity, it is capable of showing the remaining electric quantity of the rechargeable battery 311 by the following 2 ways:

(1) pressing the push-button 93 to trigger the push-button switch 54, the first, second, third and fourth LED lamps are all lightened when the electric quantity of the rechargeable battery 311 is from 76% to 100%; the first, second and third LED lamps are lightened when the electric quantity of the rechargeable battery 311 is from 51% to 75%; the first and second LED lamps are lightened when the electric quantity of the rechargeable battery 311 is from 26% to 50%; and the first LED lamp is lightened when the electric quantity of the rechargeable battery 311 is 25%.

(2) pressing the push-button 93 to trigger the push-button switch 54, the fourth LED lamp is lightened when the electric quantity of the rechargeable battery 311 is from 76% to 100%; the third LED lamp is lightened when the electric quantity of the rechargeable battery 311 is from 51% to 75%; the second LED lamp is lightened when the electric quantity of the rechargeable battery 311 is from 26% to 50%; and the first LED is lightened when the electric quantity of the rechargeable battery 311 is 25%.

In another specific application embodiment, the first printed circuit board 5 can be provided with only one LED lamp 53 thereon, and in the LED lamp 53 there are at least two LED chips with different colors. Pressing the push-button 93 to trigger the push-button switch 54, the LED chip with different color that corresponds to the different electric quantity of the rechargeable battery 311 will be lightened. Such as, the inside of the LED lamp 53 are provided with four colors of red, yellow, green and purple, the red LED chip is lightened when the electric quantity of the rechargeable battery 311 is from 76% to 100%, the yellow LED chip is lightened when the electric quantity of the rechargeable battery 311 is from 51% to 75%, the green LED chip is lightened when the electric quantity of the rechargeable battery 311 is from 26% to 50%, and the purple LED chip is lightened when the electric quantity of the rechargeable battery 311 is 25%.

Of course, the configuration of number and type of the LED lamp 53, as well as the displaying method of remaining electric quantity of the rechargeable battery 311 can be designed according to the needs. No excessive restrictions are made herein.

Furthermore, continuing to refer to FIG. 2, the first printed circuit board 5 is fixed to the main bracket 3 by means of screw or snapping, the rechargeable battery 311 is loaded within the battery cavity and fixed to the first printed circuit board 5 by means of welding or pasting. On the first printed circuit board 5 there are provided with a positive terminal (not shown) and a negative terminal (not shown). The positive electrode of the battery and the negative electrode of the battery are electrically connected to the positive terminal and the negative terminal respectively, and the positive terminal and the negative terminal are electrically connected to the first positive pole 321 and the first negative pole 322 respectively. Wherein, a charging port 51 can be disposed on the first printed circuit board 5, with the positive pole and the negative pole of the charging port 51 being electrically connected with the negative terminal and the positive terminal. Via the charging port 51, an external power source provides power for the rechargeable battery 311. Of course, a transformer circuit can be disposed at the charging port 51 side or between the charging port 51 with the positive terminal and the negative terminal, so that an external AC or DC is transformed into more suitable voltage then applied for the rechargeable battery 311. No excessive description is provided herein.

Also, please continue to refer to FIG. 2, an output port 52 can also be disposed on the first printed circuit board 5, with the positive pole and negative pole of the output port 52 being electrically connected with the negative terminal and the positive terminal. The rechargeable battery 311 provides power for an external device via the output port 52. External device can be a mobile phone, PDA (Personal Digital Assistant, PDA), MP3, MP4, flashlight, etc. Adopting the rechargeable battery 311 as a backup power supply can further enrich features of the cigarette box 100, improve user experience, and address the urgent needs of user under specific situation.

In the above embodiments, the charging port 51 and the output port 52 may both be designed as generic USB interfaces, which makes it more compatible and thus improve the competitiveness of products.

Also, please continue to refer to FIG. 2, besides including a battery rod accommodation cavity 36 for accommodating the individual battery rod 6 and charging the battery rod 6 by means of inserting, the main bracket 3 also includes at least one electronic-cigarette accommodation cavity 37, which is used for accommodating one assembled electronic-cigarette 7. Of course, in order to facilitate smokers to carry more electronic-cigarettes 7 or electronic-cigarettes 7 with different flavors, the main bracket 3 may also includes at least one atomizer accommodation cavity 38 for accommodating atomizer only. At this point, equivalently one main bracket 3 can host at least two electronic-cigarettes 7. The complete schematic is as shown in FIG. 2, the main bracket 3 includes an electronic-cigarette accommodation cavity 37, a battery rod accommodation cavity 36, and two atomizer accommodation cavities 38. The number and position of each type of the accommodation cavity are provided depending on the specific design needs, and no excessive description is provided herein.

The present invention also provides an LED light guide piece fitting in the electronic-cigarette box. The LED light guide piece includes a substrate, one side of the substrate extends outward and forms light guide cylinder and push-button corresponding to the through holes provided in the side wall of the outside box body, wherein the light guide cylinder corresponds to the LED lamp on the first printed circuit board which is provided within the outside box body, and the push-button corresponds to the push-button switch on the first printed circuit board which is provided within the outside box body. For details please refer to the LED light guide piece described in any one of the above embodiments.

The present invention also provides a box body for electronic-cigarette box, wherein, the box body accommodates a first printed circuit board therein, and the first printed circuit board is provided with a LED lamp for displaying electric quantity and a push-button switch for controlling the LED lamp; the side wall of the box body is provided with two or more through holes for separately corresponding to the light guide cylinder and push-button which are disposed on the outer LED light guide piece. It is possible to refer to the box body described in any one of the above embodiments.

The above description discloses the specific embodiments of the present invention. Note that those skilled in the art will appreciate multiple modifications and variations in light of the features of the present invention, and those modifications and variations shall be deemed within the scope of this invention.

What is claimed is:

1. An electronic-cigarette box including a box body, wherein, a first printed circuit board is accommodated in the box body, more than two light emitting diode (LED) lamps for displaying electric quantity and a push-button switch for controlling the LED lamps are disposed on the first printed circuit board, more than two through holes are disposed in one side wall of the box body, and the cigarette box also includes an LED light guide piece which comprises a substrate, with one side of the substrate extending outward and forming light guide cylinders and a push-button corresponding to the through holes, wherein the light guide cylinders correspond to the LED lamps, the push-button corresponds to the push-button switch;

a baffle provided in the box body extends along a lengthwise direction of the side wall, wherein the baffle has a shape of strip and forms an import slot together with the side wall; the LED light guide piece is assembled in the box body along the import slot, the light guide cylinders on the LED light guide piece are aligned to the LED lamps of the first printed circuit board in one-to-one correspondence, and the push-button on the LED light guide piece is aligned to the push-button switch of the first printed circuit board, the light guide cylinders and the push-button are aligned to the through holes in the box body respectively;

the substrate with the light guide cylinders and the push-button thereon forms an integrated LED light guide piece;

the LED lamps are arranged at intervals on the first printed circuit board with uniform length and direction, the light guide cylinders on the LED light guide piece are arranged at intervals on the substrate with uniform length and direction correspondingly, and accommodate the LED lamps one-to-one correspondingly;

the cigarette box includes a main bracket which is accommodated inside the box body;

the cigarette box includes a cover body;

the cigarette box includes a semi-automatic clamshell mechanism and a vice bracket the semi-automatic mechanism comprises a cam, a sliding block and a damping element the vice bracket defines an accommodation cavity, in which both of the sliding block and the damping element are disposed; the cam is rotatably fixed to the main bracket, the sliding block is connected between the cam and the damping element;

the damping element has one end thereof abutting against a bottom end of the sliding block, and the other end abutting against a bottom wall of the accommodation cavity;

the vice bracket is located at one side of the main bracket and installed on top of the other side wall of the box body; the sliding block is provided with a convex block on top thereof, the cam remains point contact with the first convex block at any time;

the sliding block and the damping element are capable of performing linear reciprocating motion in the accommodation cavity; the damping element is compressed downward via an external force acting on the cover body to drive the cam rotating, and the semi-automatic clamshell mechanism is capable of automatically opening or closing the cover body under an upward force of the compressed damping element without the external force, whereby to realize the semi-automatic clamshell performance.

2. The electronic-cigarette box as described in claim 1, wherein, a bottom wall of the box body is provided with a positioning bone, one end of the LED light guide piece is snap-fitted in the space formed between the positioning bone and the side wall of the box body.

3. The electronic-cigarette box as described in claim 2, wherein, the positioning bone is configured on the bottom wall of the box body by integrally molding.

4. The electronic-cigarette box as described in claim 1, wherein the LED light guide piece in the import slot is disposed between the box body and the main bracket, an inside of the main bracket is provided with a rechargeable battery, which is electrically connected with the first printed circuit board, and a remaining electric quantity of the rechargeable battery is shown via a lightening status of the LED lamp.

5. The electronic-cigarette box as described in claim 4, wherein, the first printed circuit board is provided with four monochrome LED lamps of same color, which in order are first LED lamp, second LED lamp, third LED lamp and fourth LED lamp from top to bottom, the first LED lamp, the second LED lamp, the third LED lamp and the fourth LED lamp are arranged at intervals on the first printed circuit board with uniform length and direction.

6. The electronic-cigarette box as described in claim 5, wherein, under a control of the push-button switch, the first, second, third and fourth LED lamps are all lightened when the electric quantity of the rechargeable battery is from 76% to 100%; the first, second and third LED lamps are all lightened when the electric quantity of the rechargeable battery is from 51% to 75%; the first and second LED lamps are both lightened when the electric quantity of the rechargeable battery is from 26% to 50%; the first LED lamp is lightened when the electric quantity of the rechargeable battery is 25%.

7. The electronic-cigarette box as described in claim 5, wherein, under a control of the push-button switch, the fourth LED lamp is lightened when the electric quantity of the rechargeable battery is from 76% to 100%; the third LED lamp is lightened when the electric quantity of the rechargeable battery is from 51% to 75%; the second LED lamp is lightened when the electric quantity of the rechargeable battery is from 26% to 50%; the first LED is lightened when the electric quantity of the rechargeable battery is 25%.

8. The electronic-cigarette box as described in claim 4, wherein the cover body is rotatably fixed to the box body by a shaft.

9. An electronic-cigarette box including a box body, wherein, a first printed circuit board is accommodated in the box body, more than two light emitting diode (LED) lamps for displaying electric quantity and a push-button switch for controlling the LED lamps are disposed on the first printed circuit board, more than two through holes are disposed in one side wall of the box body, and the cigarette box also includes an LED light guide piece which comprises a substrate, with one side of the substrate extending outward and forming light guide cylinders and a push-button corresponding to the through holes, wherein the light guide cylinders corresponds to the LED lamps, the push-button corresponds to the push-button switch;

the cigarette box includes a main bracket which is accommodated inside the box body;

the cigarette box includes a cover body, the cover body is rotatably fixed to the box body by a shaft;

wherein the cigarette box includes a semi-automatic clamshell mechanism and a vice bracket; the semi-automatic mechanism comprises a cam, a sliding block and a damping element; the vice bracket defines an accommodation cavity, in which both of the sliding block and the damping element are disposed; the cam is rotatably fixed to the main bracket, the sliding block is connected between the cam and the damping element;

the damping element is a compression spring, or is made from elastic rubber;

the damping element has one end thereof abutting against a bottom end of the sliding block, and the other end abutting against a bottom wall of the accommodation cavity;

the vice bracket is located at one side of the main bracket and installed on top of the other side wall of the box body; the sliding block is provided with a convex block on top thereof, the cam remains point contact with the first convex block at any time;

the sliding block and the damping element are capable of performing linear reciprocating motion in the accommodation cavity; the damping element is compressed downward via an external force acting on the cover body to drive the cam rotating, and the semi-automatic clamshell mechanism is capable of automatically opening or closing the cover body under an upward force of the compressed damping element without the external force, whereby to realize the semi-automatic clamshell performance.

10. The electronic-cigarette box as described in claim 4, wherein the cigarette box includes a second printed circuit board, the second printed circuit board is fixed to the main bracket by means of screw or snapping, and the second printed circuit board is provided with a charging port, via the charging port an external power source provides power for the rechargeable battery.

11. The electronic-cigarette box as described in claim 10, wherein the second printed circuit board is provided with an output port, the rechargeable battery provides power for an external device via the output port.

12. The electronic-cigarette box as described in claim 11, wherein, the charging port and the output port are both USB interfaces.

13. The electronic-cigarette box as described in claim 4, wherein, the main bracket is provided with at least one battery rod accommodation cavity, a battery rod is recharged by the rechargeable battery when the battery rod is inserted in the battery rod accommodation cavity.

* * * * *